(12) United States Patent
Rowland

(10) Patent No.: US 9,433,263 B2
(45) Date of Patent: Sep. 6, 2016

(54) DUAL NAME BADGE

(71) Applicant: J.F.R. ENTERPRISES INC., Johns Creek, GA (US)

(72) Inventor: Jay F. Rowland, Johns Creek, GA (US)

(73) Assignee: J.F.R. ENTERPRISES, INC., Johns Creek, GA (US)

( * ) Notice: Subject to any disclaimer, the term of this patent is extended or adjusted under 35 U.S.C. 154(b) by 0 days.

(21) Appl. No.: 14/861,102

(22) Filed: Sep. 22, 2015

(65) Prior Publication Data

US 2016/0088908 A1    Mar. 31, 2016

Related U.S. Application Data

(60) Provisional application No. 62/056,021, filed on Sep. 26, 2014.

(51) Int. Cl.
| | | |
|---|---|---|
| A44C 3/00 | (2006.01) | |
| G09F 3/20 | (2006.01) | |
| F16M 13/00 | (2006.01) | |
| G06F 1/16 | (2006.01) | |

(52) U.S. Cl.
CPC .............. *A44C 3/001* (2013.01); *F16M 13/00* (2013.01); *G06F 1/16* (2013.01); *G09F 3/207* (2013.01)

(58) Field of Classification Search
CPC ........ G09F 21/02; G09F 21/06; A44C 3/001
See application file for complete search history.

(56) References Cited

U.S. PATENT DOCUMENTS

| | | | | |
|---|---|---|---|---|
| 2,342,005 A | * | 2/1944 | Mittag | .................... A41D 13/01 2/1 |
| 2,821,035 A | * | 1/1958 | Joseph | ...................... G09F 3/18 40/586 |
| 3,214,852 A | * | 11/1965 | Ford | ........................ G09F 3/005 40/586 |
| 4,195,836 A | * | 4/1980 | Beyer | ....................... A63F 9/00 273/431 |
| 4,253,216 A | | 3/1981 | Brown | |
| D280,860 S | * | 10/1985 | Monferrato | .................... D2/829 |
| 5,347,733 A | | 9/1994 | Whittington | |
| 5,632,044 A | * | 5/1997 | Sloot | ..................... A41D 13/01 2/102 |
| 5,732,451 A | | 3/1998 | Mars | |
| 5,873,606 A | | 2/1999 | Haas et al. | |
| 6,006,455 A | | 12/1999 | Miller | |
| 6,170,181 B1 | | 1/2001 | Groner | |
| 6,282,760 B1 | | 9/2001 | Mars | |
| 6,840,420 B1 | * | 1/2005 | Hudson | .................. A44C 3/001 224/669 |
| 6,860,045 B1 | | 3/2005 | Sadler et al. | |
| 6,862,827 B2 | | 3/2005 | Gregory | |
| 7,325,349 B2 | | 2/2008 | Becker | |
| 8,356,737 B2 | | 1/2013 | Lessman | |
| 9,064,435 B2 | | 6/2015 | Forte et al. | |
| 2009/0217558 A1 | | 9/2009 | Maier-Hunke | |
| 2010/0050485 A1 | * | 3/2010 | Forte | ....................... G09F 21/02 40/1.5 |
| 2015/0113845 A1 | * | 4/2015 | Ramirez, III | ........... G09F 21/02 40/661.02 |

FOREIGN PATENT DOCUMENTS

| | | |
|---|---|---|
| CN | 203882576 U | 10/2015 |
| JP | 2005052376 A | 3/2005 |

* cited by examiner

*Primary Examiner* — Gary Hoge
(74) *Attorney, Agent, or Firm* — Eric W. Cernyar

(57) ABSTRACT

A dual name badge, or a kit for making the same, generally includes two name badges joined by a connector, the connector worn over a person's shoulder such that a first name badge on the person's front faces forward and a second name badge on the person's back faces the opposite direction. Thus the dual name badge is generally bi-directional. In use, generally, two name badges are printed and joined by a connector, the connector is bent to fit over a shoulder, and at least one releasable attachment is added to allow the dual name badge to attach to clothing. The first name badge may be oblique to the connector or to the second name badge. Thereby, the dual name badge is properly placed on a torso and enhances a person's identification.

21 Claims, 8 Drawing Sheets

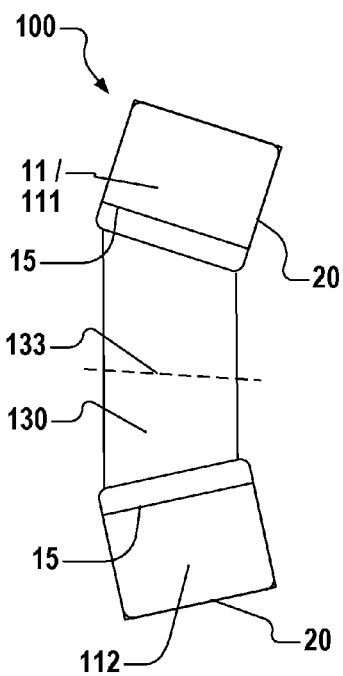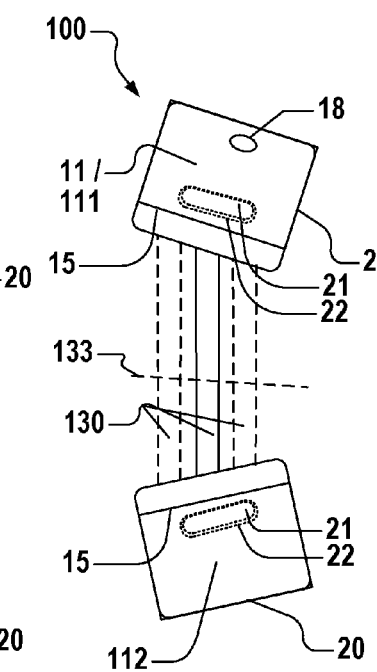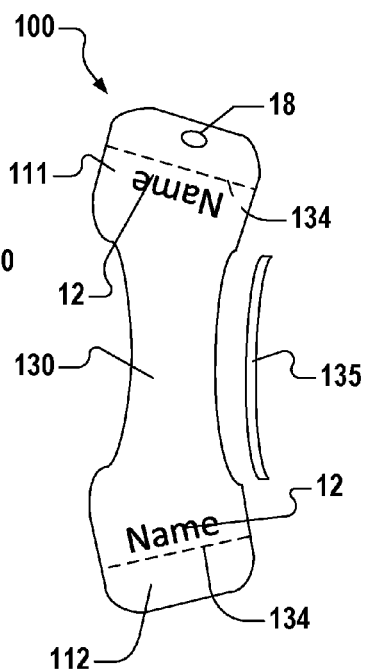
Fig. 10   Fig. 11   Fig. 12
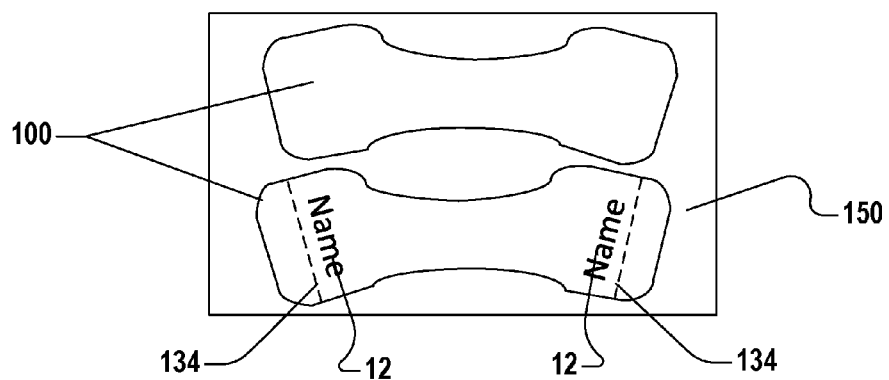
Fig. 13

DUAL NAME BADGE

RELATED APPLICATIONS

This application claims priority to my U.S. provisional patent application Ser. No. 62/056,021, filed Sep. 26, 2014, entitled "Dual Name Badge," which is herein incorporated by reference and referred to herein as "the provisional application."

TECHNICAL FIELD

The present disclosure generally relates to name badges, including kits and methods for manufacturing name badges, and more particularly relates to a bi-directional name badge worn while networking in a group, and associated kits and methods for making such name badges.

BACKGROUND

Name badges are commonly worn to self-identify and to aid people in making new acquaintances. Name badges come in many different forms, particularly for business use, including paper, clear plastic holders, and etched or printed plastics and metals. Such badges may be held in place by adhesives, pins, clips, lanyards, magnets, and other means.

Quality name badge design and proper placement may greatly ease introductions. For example, a badge should be visible when shaking hands, be legible from a few feet away, and provide an idea of your occupation.

Beyond poor graphic design, current name badges often suffer from a number of functional difficulties. Paper and adhesive tags are of limited use because they are not reusable. For reusable badges, the chief challenge is the ability to attach a badge to one's clothing regardless of the outfit and without damaging the fabric. The next challenge is to keep the name badge properly oriented so that it is readable and professional. Clips and lanyards allow name badges to turn, and other name badges often tilt downward, particularly when the fabric upon which they are placed sags.

The greatest functional difficulty with most name badges is that when shaking hands, one must choose between making eye contact and squinting to read the name badge in order to figure out to whom you are talking Although common, this practice is often embarrassing for both parties and leads to a poorer quality of business interaction, which may decrease revenue. Many people will avoid another networking opportunity so that they will avoid this discomfort, and their business suffers correspondingly.

There is need in the art for a name badge that aids proper positioning on any wardrobe, stays in place, improves identification, and does so affordably.

SUMMARY

A dual name badge, or a kit for making the same, generally includes two name badges or display areas joined by a connector, the connector worn over a person's shoulder such that a first name badge on the person's front faces forward and a second name badge on the person's back faces the opposite direction. Thus the dual name badge is generally bi-directional. In this application, the terms name tag and name badge are used interchangeably. A method of forming a dual name badge generally includes printing two name badges, joining them by a connector, bending the connector to fit over a shoulder, and including a means of releasable attachment of the name badge to clothing. The first name badge may be oblique to the connector or to the second name badge. Other systems, devices, methods, features, and advantages of the disclosed product and methods for forming a dual name badge will be apparent or will become apparent to one with skill in the art upon examination of the following figures and detailed description. All such additional systems, devices, methods, features, and advantages are intended to be included within the description and to be protected by the accompanying claims.

BRIEF DESCRIPTION OF THE DRAWINGS

The present disclosure may be better understood with reference to the following figures. Corresponding reference numerals designate corresponding parts throughout the figures, and components in the figures are not necessarily to scale.

FIG. 10 is a top view of a configuration of an oblique dual name badge.

FIG. 11 is a top view of a configuration of an oblique dual name badge.

FIG. 12 is a top view of a configuration of an oblique dual name badge.

FIG. 13 is a top view of two dual name badges formed from one sheet.

DETAILED DESCRIPTION

Figure 1:
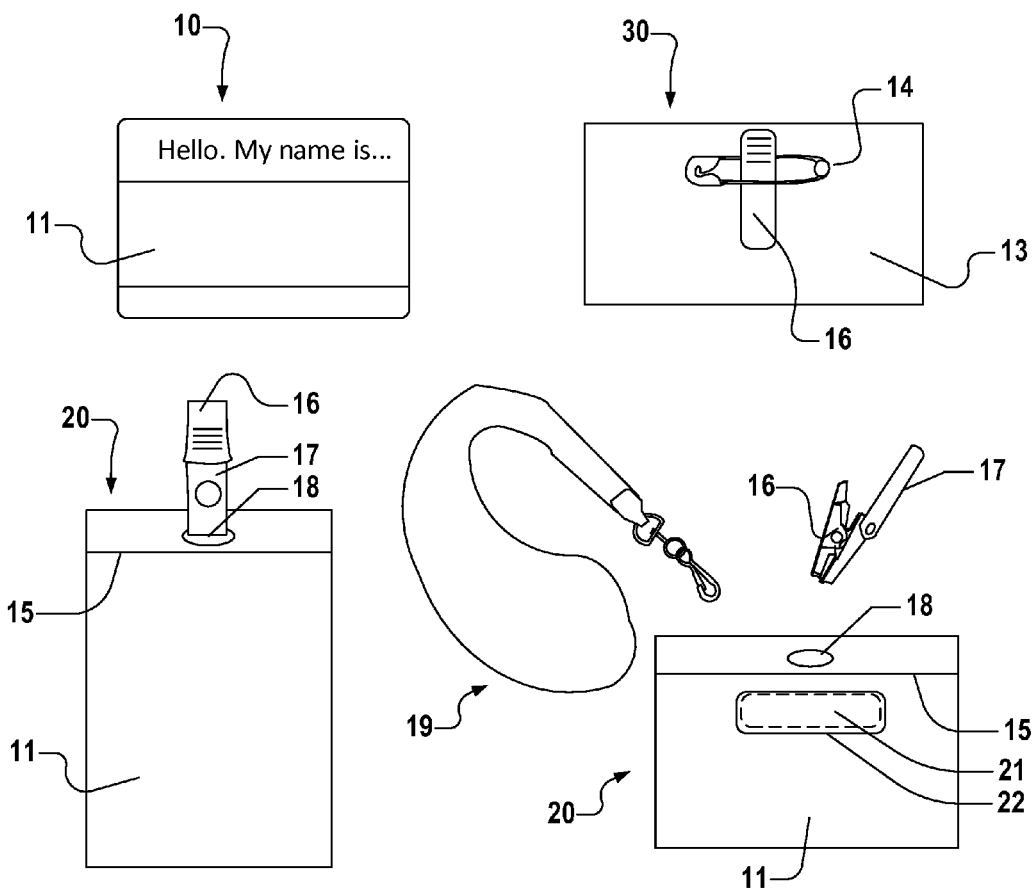
FIG. 1 illustrates several embodiments of prior art name tags.

It will be appreciated that the drawings are provided for illustrative purposes and that the invention is not limited to the illustrated embodiment. For clarity and in order to emphasize certain features, not all of the drawings depict all of the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, it should be understood that there is no restrictive one-to-one correspondence between any given embodiment of the invention and any of the drawings.

Also, many modifications may be made to adapt or modify a depicted embodiment without departing from the objective, spirit and scope of the present invention. Therefore, it should be understood that, unless otherwise specified, this invention is not to be limited to the specific details shown and described herein, and all such modifications are intended to be within the scope of the claims made herein.

In describing preferred and alternate embodiments of the technology described herein, as illustrated in FIGS. 1-14, specific terminology is employed for the sake of clarity. The technology described herein, however, is not intended to be limited to the specific terminology so selected, and it is to be understood that each specific element includes all technical equivalents that operate in a similar manner to accomplish similar functions.

Described below are embodiments of a dual name badge, kits for making a dual name badge, and methods for forming a dual name badge. Such products and methods may comprise two name badges joined by a connector. The dual name badge generally includes two name badges or display areas joined by a connector, the connector worn over a person's shoulder such that a first name badge on the person's front faces forward and a second name badge on the person's back faces the opposite direction and such that the dual name badge is bi-directional. The dual name badge may also be referred to as anteroposterior, because it relates to both front and back. In use, a first name badge is positioned about 4" down from a person's shoulder, between the shoulder and neckline, thus placing the connector over the person's shoulder such that the connector is properly aligned across the shoulder and a second name badge is properly positioned on the back of the person's shoulder. Thereby, the dual name badge is worn such that the first name badge faces forward and the second name badge faces rearward.

Many different embodiments are contemplated. Each embodiment includes two identification displays, referred to here as name badges or display areas, and a means of connecting the two name badges so that they may be worn on a body.

Other embodiments include a combination and/or selection of some of, but not all of, the following features. A connector and one or more name badges may be formed as one piece. They may also be printed as one piece. When the connector is in a flattened orientation, the two name badges may be oblique to each other, such that when the connector is bent over a shoulder, the two name badges are properly oriented for viewing. A connector and one or more name badges may be separate pieces that together form a dual name badge. A name badge may comprise a pocket or holder into which an identification may be placed. A connector may be placed over a shoulder and one or two name badges adjusted such that one or more name badges or their display areas are oblique to each other, oriented for proper viewing.

The connector or its attachment to a name badge may be adjustable so that the connector length is adjustable. The name badge may swivel on the connector so that the name badge orientation is adjustable. The connector or one or more name badges may be held in place by gravity, pressure, magnet, clip, pin, or a variety of other means.

FIG. 1 illustrates several embodiments of prior art name tags. A common paper name tag 10 having a display face or area 11 to be filled in by the wearer is typically adhesively attached to clothing and easily removed. A badge holder 20 has a pocket opening 15 and a clear display face 11, such that a printed piece of identification may be inserted into the pocket, making the badge holder 20 a name tag 20 with display area 11. The name badge 20 has an aperture or hole 18 that receives a strap 17 with clip 16 that is used to releasably attach the name badge 20 to clothing. Alternatively, name badge 20 has an adhesively attached metal strip 22 with paired magnet 21 for releasable attachment. (In this specification, a "magnet" 21 may be paired with one or more other magnets and/or with one or more pieces of material attracted to a magnet. The order of magnets 21 and metal strips 22 may often be reversed. Here, the magnet 21 may be adhesively attached to the name badge 20.) Name badge 30 may be a plastic or metal display, or other material, with a clip 16 mounted to its back 13. The name badge 30 may also comprise a pin 14 or may comprise a pin 14 without a clip 16. A name badge may be horizontal, vertical, or other orientation. A lanyard 19 may be attached via a hole 18 and worn around a person's neck, allowing the name badge 20 to flip around. Other prior art is often a simple variation or combination of these elements. Some prior art name badges 20, particularly for use at conferences, may contain additional pouches, electronics, and sections that flip out to present more information.

Name badges typically range from 1"×3" to 4"×5" and larger for conference badges. However, the name badges are not limited to these dimensional ranges and may be any size reasonably worn and displayed on a person's chest as part of a professional image. Business networking experts usually recommend placement of a name badge on a person's right side, about 4" down from the top of the shoulder. Experts suggest lapel pins and broaches be worn on a person's left side.

Figure 2:
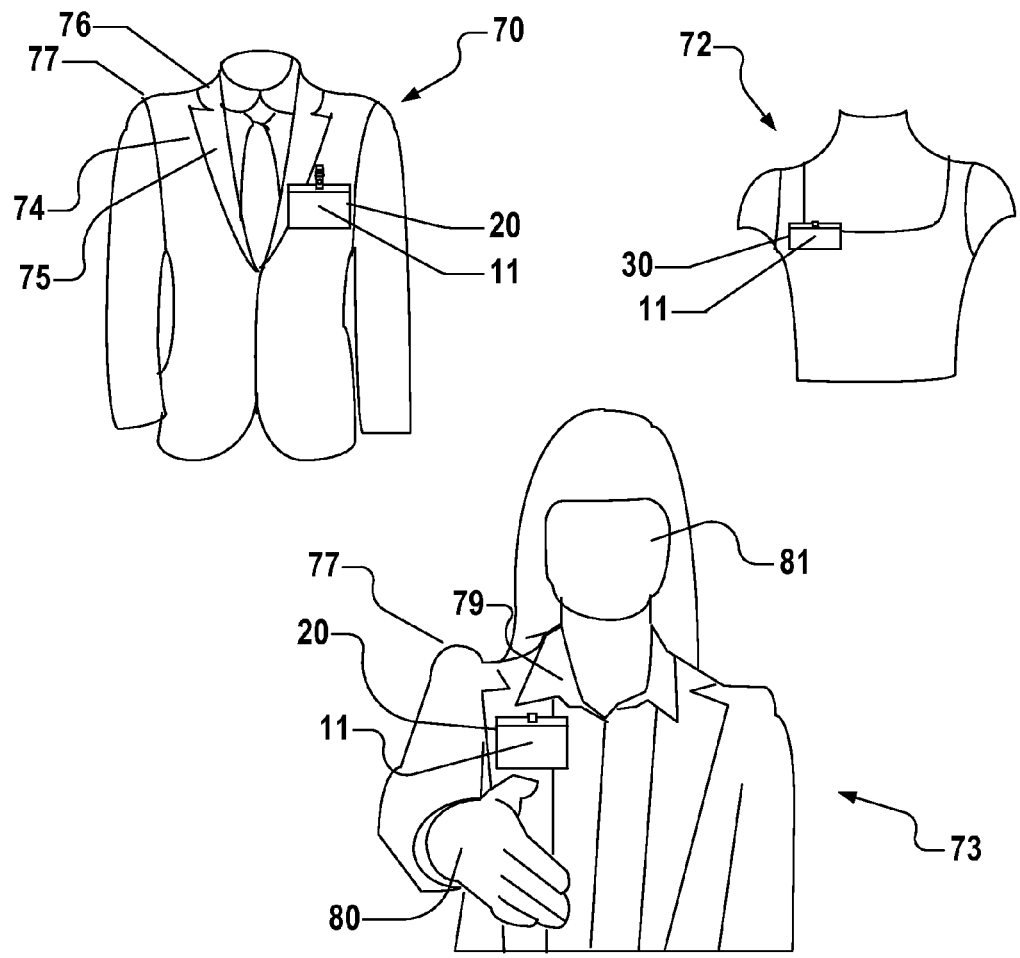
FIG. 2 illustrates typical positioning of prior art name badges on a variety of garments.

FIG. 2 illustrates current practice for positioning name badges on a variety of clothing. Men typically wear a shirt 71 or suit jacket 70 and attach a name badge 20 to a lapel 75 or to their jacket pocket (not shown) on the left side. Proper placement 74 would be on the right side. Women wear a wider array of clothing styles and materials, making name badge 20 placement more challenging. For example, a woman's torso 72 shows a dress top with straps and a small name badge 30 with a small display area 11. The name badge 30 may sag so it rests at an angle that is difficult to read, or a commonly uncomfortable situation may arise in which one must appear to stare at the woman's chest while trying to read the name badge 30. Such situations may decrease business and decrease people's desire to meet new business contacts. A woman's business suit 73 is another example of the variety in women's clothing. In general, women are sensitive to a method of name badge 20 attachment damaging or detracting from their clothing.

Figure 3:
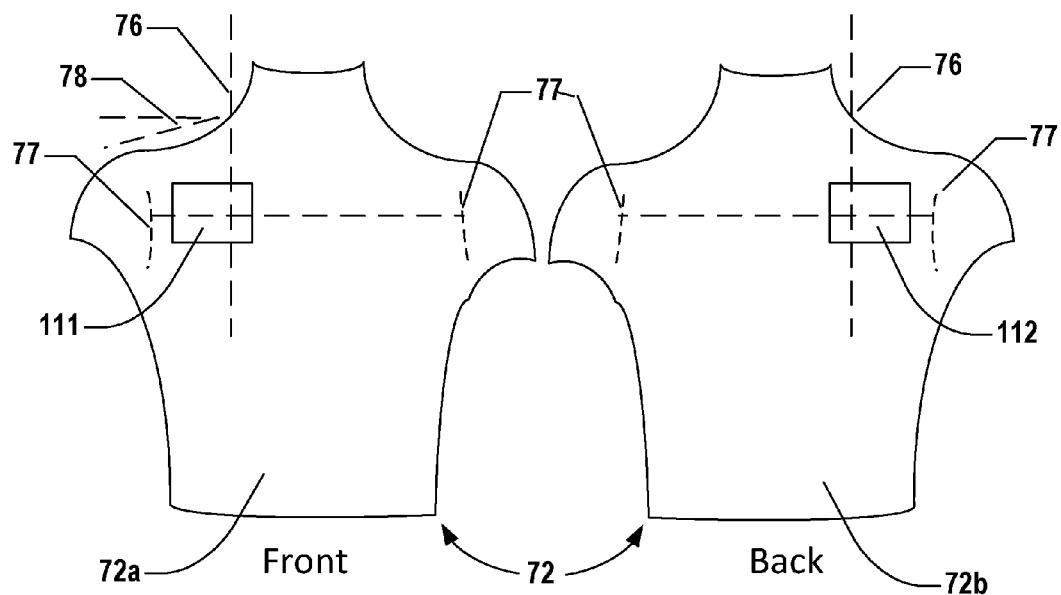
FIG. 3 illustrates preferred areas for positioning name badges on a torso.

FIG. 3 illustrates a preferred display area 111 on the front of a torso 72a and a display area 112 on the back of a torso 72b, with proper placement enhanced by the present invention. Torsos 72 may be different sizes, but a front display area 111 is generally on the person's right side, with the majority of the display area 111 between the neck line 76 and the armhole/shoulder joint 77, with the display area 111 a few inches down from the top of the shoulder and roughly located on a line between armholes 77. In similar fashion, a back or rear display area 112 is generally also on the person's right side, with the majority of the display area 112 between the neck line 76 and the armhole/shoulder joint 77, with the display area 112 a few inches down from the top of the shoulder and roughly located on a line between armholes 77. A rear display area 112 may be worn a bit higher in order to avoid chair backs when a person sits. The present invention is not limited to being worn on the right side, but may also be worn on the left side.

Inclusion of a rear display area 112 enhances identification and personal interaction, which in turn leads to better business prospects. For example, you are in a room mingling with many people you do not know very well, and you spot someone you have met before, but cannot remember her name or company. Or perhaps you simply would like to narrow down the number of people you need to talk to by focusing on those in particular industries. Even with the person's back to you, you are able to gain the information you need in order to present yourself properly or to save yourself time and energy. Without this aid, an embarrassing encounter may lead to bad business, particularly for an introvert. As another example, you may have to remain seated in rows in a meeting with little chance for interaction with others, but a rear display area 112 allows you to note people you would like to meet, and for others to note you. This in turn leads to better business and potentially increased revenue or new career connections.

Anthropometric measurements may vary by race and over time, but from U.S. samples the average female shoulder width is 14", and the average male shoulder width is 18.5". Shoulder width is measured from shoulder to shoulder. Average shoulder slope 78 is in the range of 22 to 23 degrees. Slope 78 may decrease or increase somewhat based on posture and muscle mass.

Figure 4:
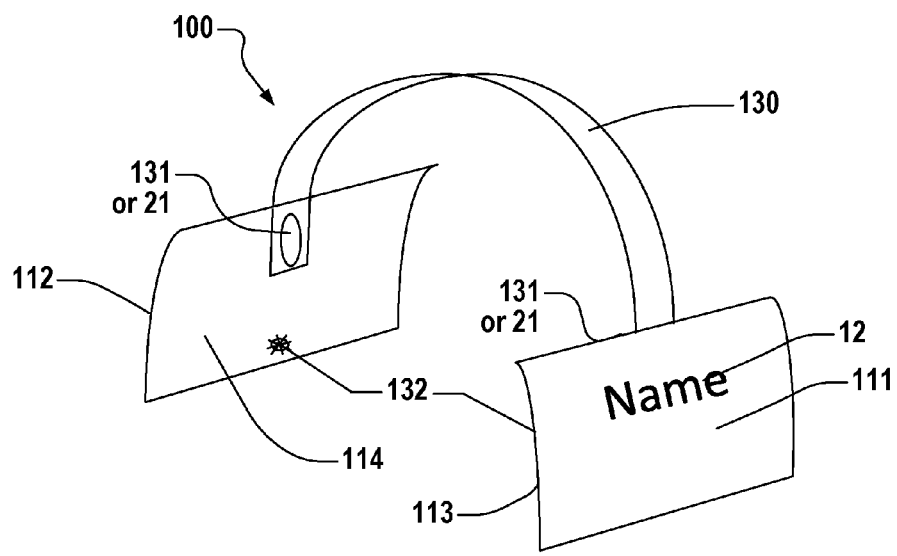
FIG. 4 is a perspective view of a dual name badge.

FIG. 4 is a perspective view of a dual name badge 100, the present invention, with front display/name badge 111 and rear display/name badge 112. A display may also be called a panel. The dual name badge 100 is generally bi-directional. A connector 130 that may be called a band 130 connects the two name badges 111 and 112 and typically rests on a person's shoulder, such that the backs 113 and 114 of the displays are next to the person's torso 72. It is important to note that the "shoulder" area is defined generally in this application, for two reasons. First, literally every human is different in terms of their body measurements, and a product designed for "universal fit" will not rest exactly in the same way on each body. Second, placement of the product is a marketing issue, not a medical issue, so the issue may be addressed more generally. In common language, the "shoulder" may include the area from a person's neckline 76 to their upper arm, the area around the shoulder joint/armhole 77 itself, the area that transitions from the shoulder into the upper chest, and the area that transitions from the shoulder into the upper back. The front display area 111 in particular may at times rest against a person's chest, which may or may not be more evident depending upon the person's body build, and this chest area is understood to be in the neighborhood of, or adjacent to, the shoulder area (as depicted in FIGS. 3 and 7-9). In this way, a first name badge 111 may be positioned on a single shoulder and adjacent chest (viewable from in front of the person) and a second name badge 112 positioned on the same single shoulder and adjacent back (viewable from behind the person). For a professional look, the first and second badges 111 and 112 may terminate in those general areas on the upper half of a person's torso 72. Any product that continues further down the body or outside of those general areas will look unprofessional, which means it will not function properly, and be difficult to market profitably. The dual name badge 100 may be called "shoulder-centric" or "local to the single shoulder and contiguous areas."

A releasable method of attachment is included. In this case a burr-like attachment 132 clings to clothing, but the invention is not limited to his method of releasable attachment. Also in this instance, a Velcro®, swivel with lock, or other adjustable attachment 131 connects the connector 130 to the two name badges 111 and 112 and allows the dual name badge 100 with printed identification 12 to adjust for the shoulder slope 78. Printed identification 12 may include logos or other printings than names. The invention is not limited to this method of adjustment, and adjustable elements may be located elsewhere on the connector 130 or name badges 111 and 112. In one embodiment, a connector 130 may be worn under clothing and, using magnets 21 as adjustable attachment 131 or another workable means of attachment, a front display area 111 or name badge 111 and a rear display area 112 or name badge 112 may be worn over the clothing and attached to the connector 130. Thus, part of the dual name badge 130 may be placed under clothing, and part on top. When the wearer moves the adjustable attachment 131 (with the use of Velcro® or magnets 21, for example), the length of the connector 130 between the name badges 111/112 may be changed.

Figure 5:
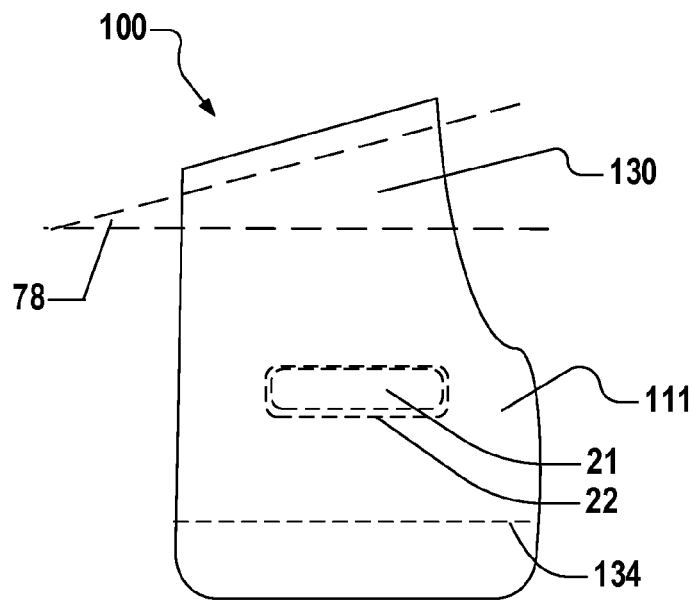
FIG. 5 is a front view of a dual name badge as worn over a shoulder.

FIG. 5 is a front view of a dual name badge 100 having an arch-shaped connector 130 slanted along the coronal plane to fit the average shoulder slope 78 so that it is aesthetically pleasing when worn over a shoulder. Even with the shoulder slope 78, a person's identifying information is rendered generally level and readable, as indicated by the dashed "name line" 134 on the front display 111. Considered geometrically, a vertical arch formed between the topmost point of the inner edge of the connector or band 130 and the bottom edges of the front and back displays 111, 112, and parallel to the sagittal plane, is higher and longer than a laterally-spaced apart vertical arch formed between the topmost point of the outer edge of the connector or band 130 and the bottom edges of the front and back displays 111, 112. Moreover, the dual name badge 100 is formed so that when worn in an optimally fitting way, the front and back displays 111, 112 are roughly parallel to and equidistant from the coronal plane and that when projected against the coronal plane, have roughly the same coronal plane coordinates (i.e., they substantially overlap). However, every human body is different, and an optimal fit is not expected. An adhesively or otherwise attached metal strip 22 with paired magnet 21 on the underside of the dual name badge 100 provides one means of releasable attachment. The metal strip 22 and magnet 21 may be of various materials, sizes, number, and location, and the invention is not limited to this form or releasable attachment.

The dual name badge 100 is not limited to this design, and in other designs more portions of the connector 130 and the back of the rear display 114 (as in FIG. 6) may be seen from the front view when not being worn. If plastic is utilized, it is envisioned that the corners will be rounded to avoid jabbing the wearer. PET, vinyl, and other plastics in the 10-30 mil range are thin enough to print readily, flexible enough to aid comfort, and thick enough to hold shape and be durable. The dual name badge is not limited to plastic or to those thicknesses of material.

Figure 6:
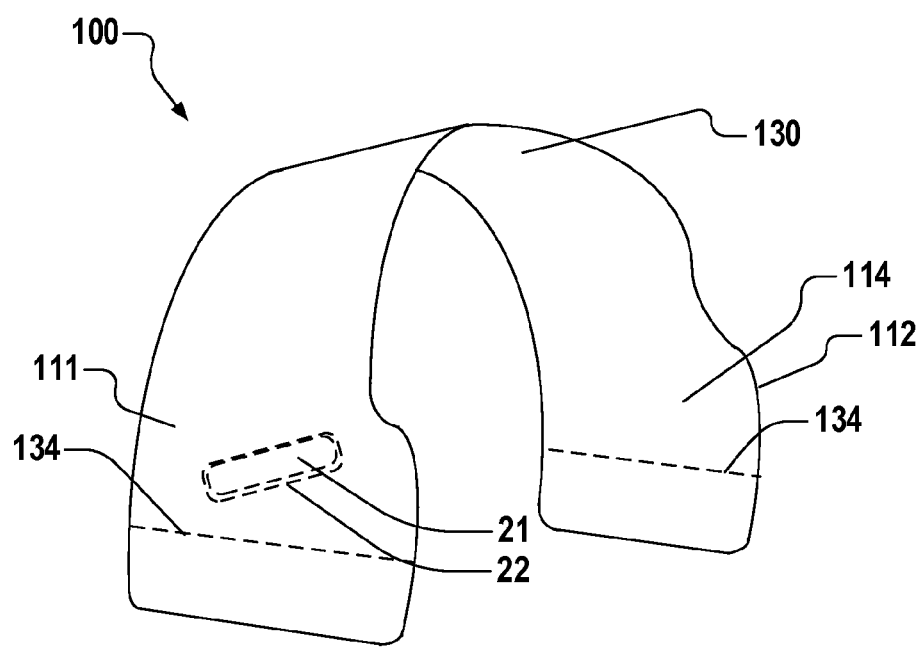
FIG. 6 is a perspective view of a dual name badge as worn over a shoulder.

FIG. 6 is a perspective view of a dual name badge 100 with a rounded connector or band 130 shaped as worn over a shoulder. The dual name badge 100 allows free and comfortable movement of the person's arm and neck. Each display area 111 and 112 may be a standard 3"×4" badge size, but is not limited to that specific size, with the connector 130 itself as additional printable display area. A connector 130 and front and rear displays 111 and 112 may be configured such that a few sizes fit a majority of men and women, with many men and women able to wear the same sizes, as indicated by the average measurements. To accomplish this purpose for a slender man and average woman about 5.5' to 6' tall, for example, a dual name badge 100 is about 12.5" in length at its most distant corners, which would be on the side next to the wearer's neck. Varying the lengths of the connector 130 and/or display areas 111 and 112 varies the overall size of the dual name badge 100 for other body sizes. The dual name badge 100 may remain discrete enough that it doesn't detract from the wearer's overall fashion. The metal strip 22 on the underside of name badge 100 may be applied at a diagonal from the neck down toward the side of the body for ease of magnet 21 insertion under clothing.

FIGS. 5 and 6 illustrate at least one band 130 that connects the first name badge 111 to the second name badge 112, wherein the at least one band 130 is configured to rest upon and substantially conform to a single shoulder of a person, positioning the first and second name badges 111 and 112 on an upper portion of one side of the person's torso 72. The display area of the first name badge 111 is viewable from in front of the person and the display area of the second name badge 112 is viewable from behind the person. "Conform" does not limit the connector or band 130 or dual name badge 100 to be tightly form fitting, though they may be. Rather, by conforming to or corresponding with the shoulder, the dual name badge 100 and band 130 act in harmony with the shoulder. The dual name badge 100 and shoulder do not need to agree in every detail.

Figure 7:
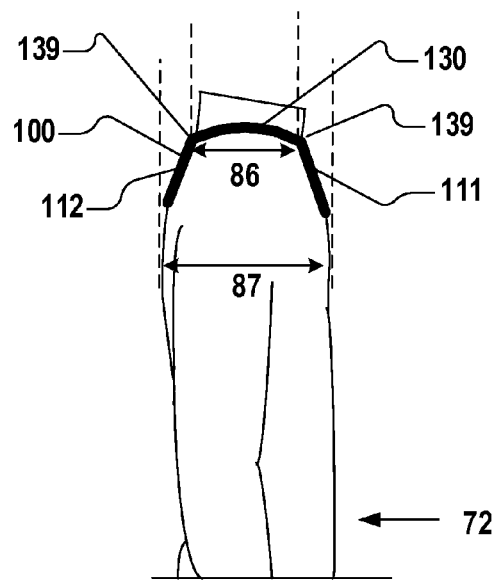
FIG. 7 illustrates from a side view the positioning of a dual name badge on a torso.

FIG. 7 illustrates from a side view the positioning of a dual name badge 100 on a slender torso 72. Whereas FIG. 6 shows a smoothly curved connector or band 130, one implementation of the connector 130 may incorporate distinct angles or bends 139 between segments of the connector 130. In either case, the connector 130 is not required to fit the shoulder without gaps between the clothing and connector 130. Bends in the connector or band 130 may allow it to substantially conform to a variety of shoulder and chest sizes. We infer neck depth 86 (or shoulder depth at the neck) from anthropometric studies to average about 4" to 6". Chest depth 87 typically ranges from 6" to 15" for men and women, with an average of 8.5" to 9.5". As a chest deepens, the front display area 111 typically remains above the deepest portion 87 of the chest, aiding "universal fit" of a few dual name badge 100 sizes for most adults.

Figure 8:
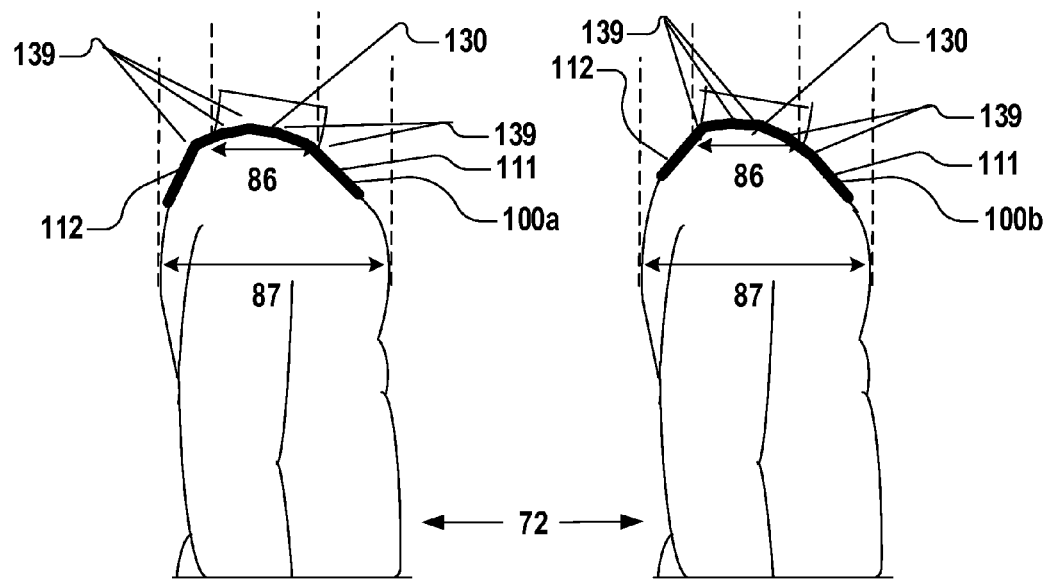
FIG. 8 illustrates from a side view alternate positioning of a dual name badge on a deeper torso.

FIG. 8 illustrates from a side view alternate positioning of a dual name badge 100 as a shoulder piece on a deeper torso 72. The dual name badge 100 flexes to expand and fit. In the image on the right, the dual name badge 100 is shifted slightly to the front of the torso 72, with the connector bends 139 aiding this shift, such that alternative positioning accommodates a variety of shoulder/chest shapes. Such accommodation is helpful if the front display area 111 needs to move forward so it is easier to see. A typical body has a slope from the shoulder to the deepest part of the chest 87, with the dual name badge 100 residing above the chest depth 87, so a shallower connector 130 may fit multiple body types.

Figure 9:
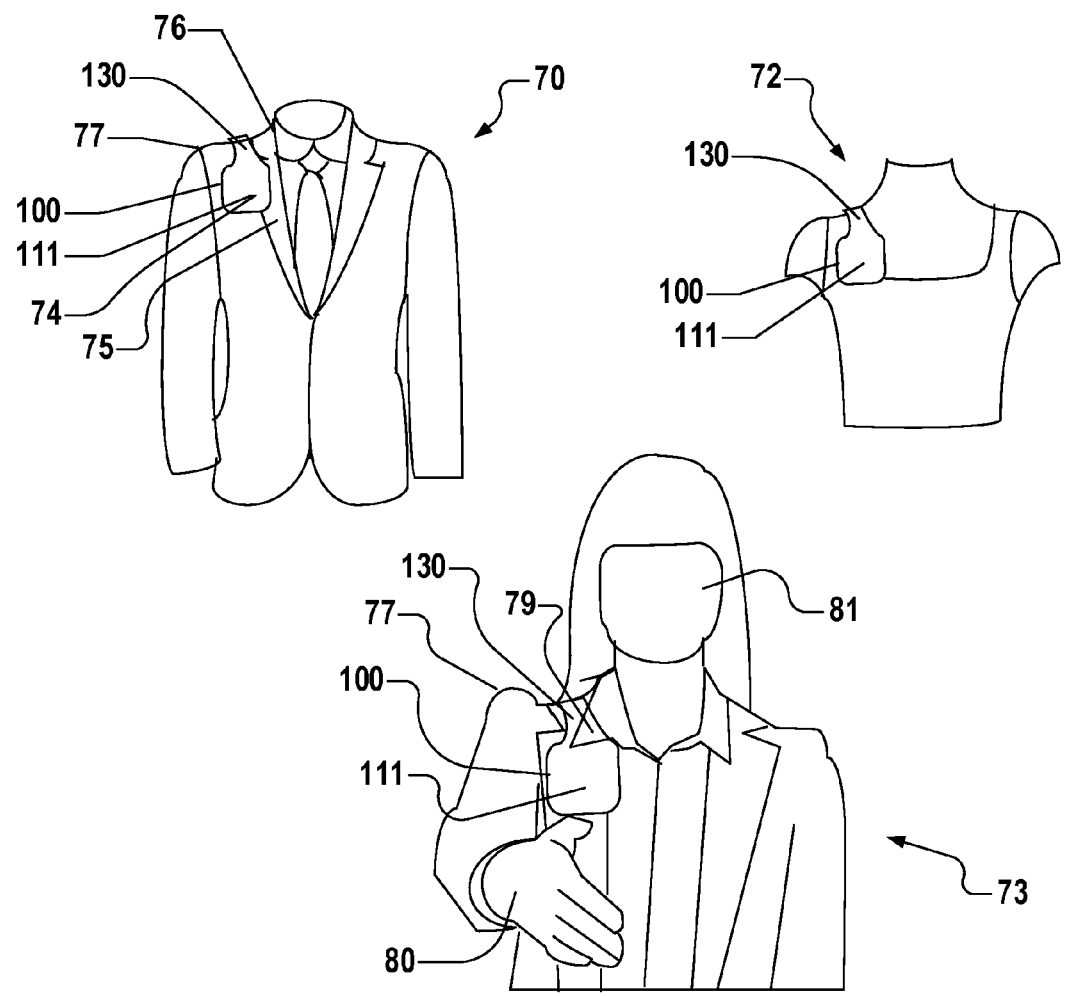
FIG. 9 illustrates positioning of a dual name badge on a variety of garments.

FIG. 9 illustrates positioning of a dual name badge 100 on the variety of clothing types discussed in FIG. 2. A dual name badge 100 is worn over a man's shirt 71 or suit jacket 70, a connector or band 130 resting over the shoulder between the neckline 76 and arm hole 77. Proper placement 74 of the front display area 111 is aided by the connector 130 and the effects of gravity and compression front to back, as well as other means (not shown) of releasable attachment. The connector or band 130 may pass under a collar and either over or under a lapel 75. The rear display area (112, not shown) is also in its proper place at the other end of the connector 130. The connector 130 itself may be utilized as a display area, perhaps featuring a logo and leaving more room in the front display area 111 for a person's name and title.

On a torso 72 showing a top with straps, a dual name badge 100 with connector 130 ensures proper placement 74 of the front display area 111 and the rear display area (112, not shown). Unlike conventional name badges, the present invention will not sag and will be less likely to draw gazes to one's chest. Instead, as shown by the woman in a business suit 73, as a person reaches to shake her hand 80 and make eye contact 81, one may easily view the front display area 111 of the dual name badge 100. The connector 130 functions with most shoulder 77 and other elements of clothing designs with less chance of movement or fabric damage. The connector or band 130 may pass over or under a collar 79.

A purpose of the improvements embodied in the dual name badge 100 is to aid identification, which primarily includes words or text. Languages are typically read horizontally or vertically. Thus, as illustrated in FIGS. 3, 5, and 9, the present invention strives for a generally (and in the ideal, substantially) orthogonal or level orientation of the front display area 111 and the rear display area 112, and especially the text itself, in order to make reading easier than reading at an angle. Such level orientation is a contrast to the slope of a person's shoulder. Also, the concept of generally level orientation includes allowance for movement and effects of the body and clothing. In more common terms, "generally level" is similar to "generally straight" or "non-crooked."

FIGS. 10-12 are top views of three exemplary configurations of an embodiment of a dual name badge 100 in which there is an oblique relationship among two or more of a front display area 111, a connector or band 130, and a rear display area 112. The oblique nature of this embodiment is precipitated by the slope of a person's shoulder and the need to have a connector 130 wrap over the shoulder while both display areas 111 and 112 rest relatively straight on a person's torso for easy reading and a professional look. A person's name preferably would be horizontally oriented, relatively parallel to a level floor. A shoulder line 133 is shown for reference, as is a "name line" 134. A hole 18 may be provided in the front display area 111 to enable an ID or trade show badge to attach via strap 17, clip 16, or other means. The dual name badge 100 may be made oblique prior to or after wrapping over a shoulder. A dual name badge may be produced for a person's right shoulder or left shoulder.

In the first two configurations, an oblique dual name badge 100 is comprised of a name badge 20 (with display area 11 and pocket opening 15) joined by a connector or band 130 to a second name badge 20 that creates a rear display area 112. The connector or band 130 may be wide as illustrated in FIG. 10, narrow as illustrated in FIG. 11, or a variety of alternative shapes. FIG. 11 uses phantom bands 130 to show a configuration with multiple "unconnected" bands 130 that function as one band 130. In that instance, the bands may be different lengths, with a longer band 130 closer to the neck and a shorter band 130 closer to the armhole 77, the bands 130 together forming an arch-shaped connector 130 as discussed in FIG. 5. As such, even without being arch-shaped, the coalition of bands 130 performs as a simple harness. A "shoulder band" 130 may have a profile or cross-section that is wider than it is deep, but is not limited to that configuration. As with rubber bands and many other types of bands 130, band depth may be equal to or greater than the band cross-section, particularly if the band 130 is decorative. The connector or band 130 may be of a similar or dissimilar material to the name badges 20. For example, a lightweight metal, c-shaped connector 130 may be a resilient band 130 with a spring bias that provides compressive force against a torso 72. The dual name badge 100 may also be formed as a unibody piece, as illustrated in FIG. 12. In a kit form, a connector or band 130 may be joined to two name badges 20 in a way that allows the name badges 20 to rotate or move into an oblique position, as in FIG. 4. An oblique orientation may also be achieved by folding a connector 130 at an angle, in which case the display areas 111 and 112 may face opposite directions prior to folding and then face the same direction after folding. In a preferred embodiment, both display areas 111 and 112 face the same direction for ease of printing or inserting identification. The distance between name badges 20 may vary to fit different shoulder sizes. A "shoulder band" 130 may be extendable telescopically or slidably to permit selective adjustment of the overall length of the dual name badge 100. The connector 130 may be releasably attached to one or more name badges 20.

In the third configuration (FIG. 12), an oblique dual name badge 100 is formed from one piece of material. A curved connector or band 130 allows the connector 130 to remain fairly substantial yet avoid a person's neck and shoulder. Both display areas 111 and 112 face up for printing of identification. If formed of a relatively pliable material and shipped flat, a curved retainer 135 formed of a stiff material and pre-bent to fit a shoulder may be attached to the connector 130 by the wearer upon receipt. The retainer 135 is configured to help the connector 130 hold its shape. Alternatively, the dual name badge 100 may be formed to fit or conform to a shoulder prior to shipment to the end user. For example, metal may be bent or plastic may be heated and bent. A plastic connector or band 130 that is resilient and retains memory of its arcuate shape will rebound to that shape after remaining flattened during storage. A retainer 135 may be used with any configuration. Alternatively, the connector 130 and retainer 135 may be two different materials formed as one piece. Or the retainer 135 may be the connector 130.

FIGS. 10-12 also illustrate embodiments of a kit for creating a dual name badge that generally include a front display area 11 or 111, a rear display area 112, and a connector 130. A kit may also include a retainer 135. In most cases, the kit includes additional means of releasable attachment to clothing; for example, FIG. 11 shows a metal strip 22 and magnet 21 (a piece of clothing intended to be placed between them). As discussed in FIG. 4, the connector 130 may be worn over or under clothing, and the magnet 21 assembly configured and applied accordingly.

One concern is ease of removing one's suit jacket 70 and relocating a dual name badge 100 from the jacket 70 to a shirt 71 without reaching underneath the shirt 71 to move a magnet 21. It is envisioned that this invention may use a metal-magnet-metal combination in place of the traditional magnet-to-metal releasable attachment. The order may be metal strip 22 under shirt 71, with magnet 21 over shirt 71, then jacket 70 over magnet 21. On top of the jacket 70 is the dual name badge 100 with metal strip 22 adhered to its back 113. As previously stated, the order and number of magnets 21 and metal strips 22 may be varied. One or more magnets 21 may be employed at one or more locations on the dual name badge 100. The piece of metal strip 22 or magnet 21 placed under the shirt 71 may comprise a thin, comfortable "handle" to aid placement and removal, as this piece typically has no hold other than magnetic attraction from layers above.

In some embodiments, the kit includes paper or other identification 12 to be inserted into or adhered to the display areas 11, 111, 112 if the dual name badge 100 is not pre-printed. Decorative pieces, electronics, pockets, and customizable parts may also be included in the kit. 15 Kit pieces may be of many materials or combinations of materials, and the pieces may be combined with each other in a variety of configurations to achieve a similar purpose.

FIG. 13 is a top view of two dual name badges 100 printed or formed out of one polymer, paper, or thin metal sheet 150, though this invention is not limited to those materials. The sheet 150 may be a roll of material or discrete pieces. It is envisioned that two dual name 20 badges 100 may be printed with printed identification 12 and cut from one standard 8½"×14" legal sized sheet 150. A sheet 150 or roll is not limited to this dimension, and the number of dual name badges 100 formed is not limited to two. Patterns may be different from those shown. Engraving, embroidering, or other means of producing identification 12 may be used, and a dual name badge 100 may be blank for later addition of identification 12. A flat product may aid shipping, but the 25 dual name badge 100 does not have to ship in a flattened form.

Figure 14:
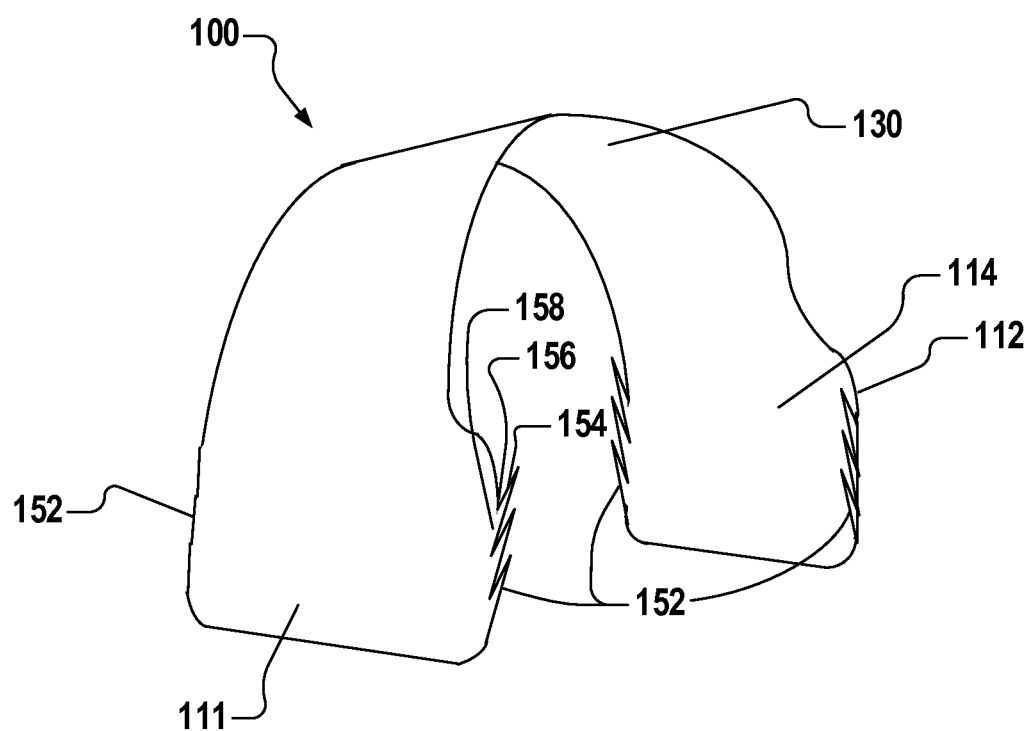
FIG. 14 is a perspective view of a dual name badge with barbs.

FIG. 14 is a perspective view of a dual name badge 100 with barbs 152 that may be formed on the edges of the dual name badge 100 when a die cuts a sheet 150. The barbs 152 are exaggerated as shown, and there may be more or fewer than the number shown. Additional barbs 152 may be on the connector or band 130, or the barbs 152 may be found only on the connector or band 130. In practice, the barbs 152 must be comfortable to wear, without stabbing the wearer, and cling to a wide variety of fabrics without snagging. Suture-like barbs 152 may be more reminiscent of plant seeds like triangular "hitchhikers" or "sticktights" that stick to clothing with painless prongs. The base 158 of the barb 152 may have a depth of about 0.1 mm, which is also referred to as the cut depth. The cut length is the length of the inner leg 154 of the barb 152 and may be in the range of 0.5-1.0 mm. The barb angle 156 may be in the range of 5-12 degrees. At this small size, the material must be durable enough to resist tearing when removed from clothing. Alternatively, barbs 152 may be adhesively attached to the backs 113 and 114 of the front display area 111 and rear display area 112.

To set the barbs 152, the wearer puts the dual name badge 100 in place, pushes down on the connector 130, and then releases. The barbs 152 on opposing sides of the body complement gravity to hold the badge 100. Alternatively, the wearer may push directly on the badges 111/112 to engage the barbs 152. The dual name badge 100 in general may be formed to press against the shoulder. To remove the dual name badge 100 with least resistance, the wearer pushes down on the connector 130 and pulls the front badge 111 away from the body. This releases the front barbs so the rear barbs may be released next. It is envisioned that a variety of microbarbs with a low profile or other miniaturized gripping elements may perform this function. The barbs 152 may be unidirectional when worn, thus becoming opposed fabric anchors. However, the barbs 152 are not limited to being unidirectional.

A method of creating a dual name badge 100 as detailed in FIGS. 3-14 generally includes the following steps: a front display area 111 and a rear display area 112 are printed and joined by a connector or band 130, the connector 130 is bent to fit over a shoulder, and at least one releasable attachment is added to allow the dual name badge 100 to attach to clothing. The first name badge 111 may be oriented oblique to the connector or band 130 or to the second name badge 112. Thus the band 130 is configured to rest upon and substantially conform to a single shoulder of a person and to position the first and second name badges 111/112 on an upper portion of one side of the person's torso 72, wherein the display area 111 of the first name badge 111 is viewable from in front of the person and the display area 112 of the second name badge 112 is viewable from behind the person. In this method, certain of the steps are optional, and the order of the steps may in many instances be re-arranged. Bending the connector or band 130 may include heat; for example, an embodiment made of a thermoplastic may be formed from sheet material 150 in a factory. Yet other embodiments may allow bending by the end user without heat.

Further, in this method inserting a printed identification into a pocket of a name badge 20 or adhesively or otherwise attaching an identification to a display area 111 or 112 is considered the same as printing a display area 111 or 112. Thus, a front display area 111 equates to a front name badge 111, and a rear display area equates to a rear name badge 112.

It will be understood that many modifications could be made to the embodiments disclosed herein without departing from the spirit of the invention. Having thus described exemplary embodiments of the present invention, it should be noted that the disclosures contained in the drawings are exemplary only, and that various other alternatives, adaptations, and modifications may be made within the scope of the present invention. Accordingly, the present invention is not limited to the specific embodiments illustrated herein, but is limited only by the following claims.

I claim:

1. A dual name badge comprising:
   a first name badge having a display area;
   a second name badge having a display area; and
   at least one band that connects the first name badge and the second name badge;
   wherein the at least one band is configured to rest upon and conform to a single shoulder of a person, positioning the first and second name badges on opposite sides of the person's coronal plane, the first and second name badges confined to an upper portion of the person's torso and to one side of the person's sagittal plane; and
   wherein the display area of the first name badge is viewable from in front of the person and the display area of the second name badge is viewable from behind the person.

2. The dual name badge of claim 1, wherein the at least one band has a non-linear shape configured to conform to a person's shoulder slope along the coronal plane so that, when worn, the edge of the at least one band nearest the wearer's neck is longer than the edge of the at least one band farthest from the wearer's neck.

3. The dual name badge of claim 1, wherein the length of the dual name badge is adjustable.

4. The dual name badge of claim 1, wherein the first name badge, second name badge, and at least one band are unibody.

5. The dual name badge of claim 1, wherein the at least one band is configured to store flat and when removed from storage rebound to a shoulder-fitting shape.

6. The dual name badge of claim 1, wherein at least one of the first and second name badges comprises a pocket.

7. The dual name badge of claim 1, wherein the display areas of the first and second name badges are oblique with respect to each other when the at least one band between them is flattened into a planar orientation.

8. A dual name badge comprising:
   a first name badge having a display area;
   a second name badge having a display area; and
   at least one band that connects the first name badge and the second name badge;
   wherein the at least one band is configured to rest upon and conform to a single shoulder of a person, positioning the first and second name badges on an upper portion of one side of the person's torso; and
   wherein the display area of the first name badge is viewable from in front of the person and the display area of the second name badge is viewable from behind the person;
   wherein the display areas of the first and second name badges are oblique with respect to each other when the at least one band between them is flattened into a planar orientation.

9. The dual name badge of claim 8, wherein the at least one band has a non-linear shape configured to conform to a person's shoulder slope along the coronal plane so that, when worn, the edge of the at least one band nearest the wearer's neck is longer than the edge of the at least one band farthest from the wearer's neck.

10. The dual name badge of claim 8, wherein the first name badge, second name badge, and at least one band are unibody.

11. The dual name badge of claim 8, wherein the orientation of one or both of the first and second name badges joined to the at least one band is adjustable.

12. The dual name badge of claim 8, wherein the at least one band is configured to store flat and when removed from storage rebound to a shoulder-fitting shape.

13. The dual name badge of claim 8, wherein the dual name badge is formed from a one-piece printed sheet.

14. The dual name badge of claim 8, wherein at least one of the first and second name badges comprises a pocket.

15. A kit for constructing a dual name badge to be worn by a person, the kit comprising:
   a first name badge having a display area;
   a second name badge having a display area; and
   at least one band that connects the first name badge to the second name badge;
   wherein the at least one band is configured to rest upon and conform to a single shoulder of a person, positioning the first and second name badges on opposite sides of the person's coronal plane, the first and second name badges confined to an upper portion of the person's torso and to one side of the person's sagittal plane; and
   wherein the display area of the first name badge is viewable from in front of the person and the display area of the second name badge is viewable from behind the person.

16. The kit of claim 15, further comprising paper upon which identification is printed.

17. The kit of claim 15, wherein at least one of the first and second name badges comprises a pocket.

18. The kit of claim 15, wherein the display areas of the first and second name badges are oblique with respect to each other when the at least one band between them is flattened into a planar orientation.

19. A method for forming a dual name badge, the method comprising:
   printing a first name badge;
   printing a second name badge;
   connecting a first name badge to a second name badge utilizing at least one band; and
   configuring the at least one band to rest upon and conform to a single shoulder of a person to position the first and second name badges on opposite sides of the person's coronal plane, the first and second name badges confined to an upper portion of the person's torso and to one side of the person's sagittal plane, wherein the display area of the first name badge is viewable from in front of the person and the display area of the second name badge is viewable from behind the person.

20. The method of claim 19, further comprising adapting the at least one band to conform to a person's shoulder slope along the coronal plane so that, when worn, the edge of the at least one band nearest the wearer's neck is longer than the edge of the at least one band farthest from the wearer's neck.

21. The method of claim 19, wherein printing results in printed identifications on the first and second name badges that are oblique with respect to each other when the at least one band between them is flattened into a planar orientation.

\* \* \* \* \*